(12) United States Patent
Wald et al.

(10) Patent No.: US 9,092,901 B2
(45) Date of Patent: Jul. 28, 2015

(54) PARALLEL GRID POPULATION

(75) Inventors: Ingo Wald, Salt Lake City, UT (US);
Santiago Ize, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 1422 days.

(21) Appl. No.: 12/515,808

(22) PCT Filed: Nov. 29, 2007

(86) PCT No.: PCT/US2007/085973
§ 371 (c)(1),
(2), (4) Date: Nov. 24, 2009

(87) PCT Pub. No.: WO2008/067490
PCT Pub. Date: Jun. 5, 2008

(65) Prior Publication Data
US 2010/0073400 A1     Mar. 25, 2010

Related U.S. Application Data

(60) Provisional application No. 60/867,781, filed on Nov. 29, 2006.

(51) Int. Cl.
*G06T 15/06*     (2011.01)

(52) U.S. Cl.
CPC ..................... *G06T 15/06* (2013.01)

(58) Field of Classification Search
None
See application file for complete search history.

(56) References Cited

U.S. PATENT DOCUMENTS

| | | | | |
|---|---|---|---|---|
| 5,583,975 | A * | 12/1996 | Naka et al. | 345/426 |
| 6,023,279 | A * | 2/2000 | Sowizral et al. | 345/421 |
| 6,556,200 | B1 | 4/2003 | Pfister | |
| 7,289,118 | B2 | 10/2007 | Schmittler | |
| 7,289,119 | B2 * | 10/2007 | Heirich et al. | 345/427 |
| 7,405,734 | B2 * | 7/2008 | Foran | 345/502 |
| 7,554,540 | B2 | 6/2009 | Hayes | |
| 2004/0100465 | A1 * | 5/2004 | Stowe et al. | 345/427 |

(Continued)

FOREIGN PATENT DOCUMENTS

| | | | | |
|---|---|---|---|---|
| EP | 0693737 | * | 1/1996 | G06T 1/20 |
| WO | WO 2008/067483 | | 6/2008 | |
| WO | WO2008067490 | | 6/2008 | |

OTHER PUBLICATIONS

Cleary et al., "Multiprocessor Ray Tracing," Mar. 1986, Journal Computer Graphics Forum, vol. 5, Issue 1, pp. 3-6.*

(Continued)

*Primary Examiner* — Andrew Yang
(74) *Attorney, Agent, or Firm* — Workman Nydegger

(57) ABSTRACT

Parallel population of a grid with a plurality of objects using a plurality of processors. One example embodiment is a method for parallel population of a grid with a plurality of objects using a plurality of processors. The method includes a first act of dividing a grid into n distinct grid portions, where n is the number of processors available for populating the grid. The method also includes acts of dividing a plurality of objects into n distinct sets of objects, assigning a distinct set of objects to each processor such that each processor determines by which distinct grid portion(s) each object in its distinct set of objects is at least partially bounded, and assigning a distinct grid portion to each processor such that each processor populates its distinct grid portion with any objects that were previously determined to be at least partially bounded by its distinct grid portion.

20 Claims, 4 Drawing Sheets

(56) References Cited

U.S. PATENT DOCUMENTS

| | | |
|---|---|---|
| 2004/0125103 A1 | 7/2004 | Kaufman et al. |
| 2006/0106815 A1 | 5/2006 | Timcencko |
| 2007/0182732 A1 | 8/2007 | Woop |
| 2007/0206008 A1 | 9/2007 | Kaufman et al. |
| 2008/0043018 A1 | 2/2008 | Keller et al. |
| 2009/0167763 A1 | 7/2009 | Waechter |
| 2009/0189898 A1 | 7/2009 | Dammertz |
| 2009/0213115 A1 | 8/2009 | Keller |
| 2009/0256845 A1 | 10/2009 | Sevastianov |
| 2010/0053162 A1 | 3/2010 | Dammertz |

OTHER PUBLICATIONS

Kobayashi et al., "Load Balancing Strategies for a Parallel Ray-Tracing System Based on Constant Subdivision," Jul. 1988, The Visual Computer, vol. 4, No. 4, pp. 199-200.*

McNeill et al., "Performance of Space Subdivision Techniques in Ray Tracing," Aug. 1992, Computer Graphics Forum, vol. 11, Issue 4, pp. 213-217.*

U.S. Appl. No. 12/374,392, filed Jan. 20, 2009, Wald et al.

International Search Report from PCT/US2007/073635, dated Aug. 5, 2008, 1 page.

Written Opinion from PCT/US2007/073635, dated Jun. 11, 2008, 4 pages.

International Preliminary Report on Patentabiltiy from PCT/US2007/073635, dated Jan. 27, 2009, 5 pages.

Wald et al., Ray Tracing Animated Scenes Using Cohert Grid Traversal, in ACM SIGGRAPH '06 Papers (Boston, Massachusetts, Jul. 30-Aug. 3, 2006) SIGGRAPH '06, ACM, New York, NY, pp. 485-493.

Ize, T. et al., "An Evaluation of Paralleled Grid Construction for Ray Tracing Dynamic Scenes," Interactive Ray Tracing 2006, IEEE Symposium on Sep. 2006, pp. 47-55.

International Search Report from PCT/US2007/085973, dated Jun. 2, 2008, 3 pages.

Mahovsky, "Ray Tracing with Reduced-Precision Bounding Volume Hierarchies" Submitted Jan. 2005 (206 pages).

Mahovsky et al., "Memory-Conserving Bounding Volume Hierarchies with Coherent Ray Tracing" IEEE Jun. 22, 2006 pp. 173-182.

Reshetov et al. "Multi-Level Ray Tracing Algorithm," ACM 2005 pp. 1176-1185 (Publication month is irrelevant since publication year is clearly before the year of application).

U.S. Appl. No. 12/374,392, Aug. 3, 2010, Office Action.

U.S. Appl. No. 12/374,392, Jan. 19, 2011, Office Action.

U.S. Appl. No. 12/374,392, Sep. 28, 2011, Office Action.

U.S. Appl. No. 12/374,392, Feb. 15, 2012, Notice of Allowance.

U.S. Appl. No. 12/374,392, May 7, 2012, Notice of Allowance.

U.S. Appl. No. 12/515,812, May 25, 2012, Office Action.

U.S. Appl. No. 12/515,812, filed May 21, 2009, Wald et al.

International Search Report from PCT/US2007/085965, dated Apr. 17, 2008, 1 page.

Written Opinion from PCT/US2007/085965, dated Apr. 17, 2008, 3 pages.

International Preliminary Report on Patentabiltiy from PCT/US2007/085965, dated Jun. 11, 2009, 4 pages.

Dmitriev et al. "Faster Ray Tracing with SIMD Shaft Culling," MPI Informatik, 2004, Germany.

Reshetov et al. "Faster Ray Packets—Triangle Intersection Through Vertex Culling," IEE/EG Symposium on Interactive Ray Tracing 2007.

Wald et al. "Realtime ray Tracing and Its Use for Interactive Global Illumination," Eurographics, 2003.

* cited by examiner

PARALLEL GRID POPULATION

CROSS-REFERENCE TO RELATED APPLICATIONS

The present invention claims priority to PCT International Application No. PCT/US2007/085973, having a international filing date of 29 Nov. 2007 and entitled "Parallel Grid Population;" and claims the benefit of U.S. Provisional Application No. 60/867,781, filed on Nov. 29, 2006 and entitled "Ray Tracing Using Coherent Grid Traversal," both of which are incorporated herein in their entireties.

This invention was made with government support under Award #B524196 awarded by the United States Department of Energy. The Government has certain rights to this invention.

BACKGROUND

In computer graphics, various methods have been developed for rendering a three-dimensional scene. One rendering method is ray tracing. Ray tracing is a global illumination rendering method that is able to render advanced visual effects such as reflection, refraction, and shadows. Ray tracing works by modeling and tracing the paths of individual rays of light as those rays make contact with objects within a three-dimensional scene. Ray tracing is thus capable of rendering a more realistic view of a scene than other rendering methods that are incapable of modeling reflection, refraction, and shadows.

In ray tracing, a single real-world item in a three-dimensional scene is typically modeled as multiple objects. Typical objects include points, lines, two-dimensional shapes, and three-dimensional shapes. For example, one commonly used object is a triangle, and a single real-world item in a three-dimensional scene can be modeled, for example, as thousands or millions of triangles. Given a real-world item in a three-dimensional scene that is modeled as thousands or millions of objects, the main objective of ray tracing the item is to determine how a given number of rays intersect with the objects that make up that item in the three-dimensional scene. Because of the high number of objects in even relatively basic three-dimensional scenes, simply testing each the ray against each object is very inefficient. Often ray tracing methods reduce the number of these intersection tests by using acceleration data structures to accelerate ray tracing. One such data structure is a grid.

A grid is a data structure that includes a plurality of cells that each defines a volume of three-dimensional space. Grids enable ray tracing applications to perform a relatively low-cost test to determine if a ray is in the general vicinity of an object before having to perform a relatively high-cost test to determine if the ray intersects with the object. In the event that the relatively low-cost test determines that the ray is not in the general vicinity of the object, the relatively high-cost test can be avoided altogether, thus resulting in a lower overall cost of ray tracing a scene.

For example, a grid can be populated with the objects that make up a three-dimensional scene. Once the grid is populated by spatially partitioning the objects into the cells of the grid, each object in the scene corresponds either to a single cell (where the object is bounded by the single cell) or to a group of cells (where the object is bounded by the group of cells).

Using this grid, where an object is bounded by a single cell, a ray tracing method can first perform a relatively low-cost test for an intersection between a ray and the cell. Where the ray does not intersect the cell, the ray tracing method can avoid a relatively high-cost test for an intersection between the ray and the object, since it is known that where the ray does not intersect with a cell the ray will also not intersect with any objects bounded by the cell. Similarly, where an object is bounded by a group of cells, a ray tracing method can first perform relatively low-cost tests for intersection between a ray and each cell in the group of cells. Where the ray does not intersect any of the cells in the group of cells, the ray tracing method can avoid a relatively high-cost test for an intersection between the ray and the object, since it is known that where a ray does not intersect with a group of cells, the ray will also not intersect with any objects bounded by the group of cells. A grid can thus be used to lower the number of relatively costly intersection tests between a ray and the objects in a scene.

Unfortunately however, even using a grid, a typical ray tracing method may nevertheless remain very costly in terms of time and processing resources, due in part to the time and processing resources that are consumed during the population of the grid with the large number of objects in a three-dimension scene. For example, as noted above, a single real-world item in a typical scene may be modeled by thousands or millions of objects. Populating a grid with thousands or millions of objects in order to ray trace a single frame of a scene can make rendering the scene very costly in terms of time and processing resources compared to other rendering methods. The time it takes to populate and repopulate a grid can be excessively slow to make ray tracing using a grid a viable alternative to other rendering methods, especially for applications that make use of dynamically changing scenes with multiple frames per second, such as simulation and game applications.

SUMMARY OF SOME EXAMPLE EMBODIMENTS

In general, example embodiments of the invention relate to grid population and, in particular, to methods for parallel population of a grid with a plurality of objects using a plurality of processors. The example methods disclosed herein enable a grid to be populated relatively quickly and efficiently.

A first example embodiment is a method for parallel population of a grid with a plurality of objects using a plurality of processors. The method includes a first act of dividing a grid into n distinct grid portions, where n is the number of processors available for populating the grid. The method also includes acts of dividing a plurality of objects into n distinct sets of objects, assigning a distinct set of objects to each processor such that each processor determines by which distinct grid portion(s) each object in its distinct set of objects is at least partially bounded, and assigning a distinct grid portion to each processor such that each processor populates its distinct grid portion with any objects that were previously determined to be at least partially bounded by its distinct grid portion.

A second example embodiment is a method for ray tracing a three-dimensional scene made up of objects using a grid that includes a plurality of cells. The method includes a first act of populating a grid with the objects in parallel using a plurality of processors, a second act of ray tracing one or more rays through the grid, a third act of determining that one or more objects in the scene have been modified, a fourth act of clearing the grid of objects, and a fifth act of repeating the first and second acts using the modified scene of objects. In this third example embodiment, the first act includes an act of dividing a grid into n distinct grid portions, where n is the number of processors available for populating the grid. The first act also includes acts of dividing a plurality of objects into n distinct sets of objects, assigning a distinct set of objects to each processor such that each processor determines by which distinct grid portion(s) each object in its distinct set of objects is at least partially bounded, and assigning a distinct grid portion to each processor such that each processor populates its distinct grid portion with any objects that were previously determined to be at least partially bounded by its distinct grid portion.

These and other aspects of example embodiments of the invention will become more fully apparent from the following description and appended claims.

BRIEF DESCRIPTION OF THE DRAWINGS

To further clarify the above and other aspects of example embodiments, a more particular description of these example embodiments will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments, and are not limiting of the invention nor are they necessarily drawn to scale. Example embodiments will be disclosed and explained with additional specificity and detail through the use of the accompanying drawings in which.

DETAILED DESCRIPTION OF SOME EXAMPLE EMBODIMENTS

Figure 1A:
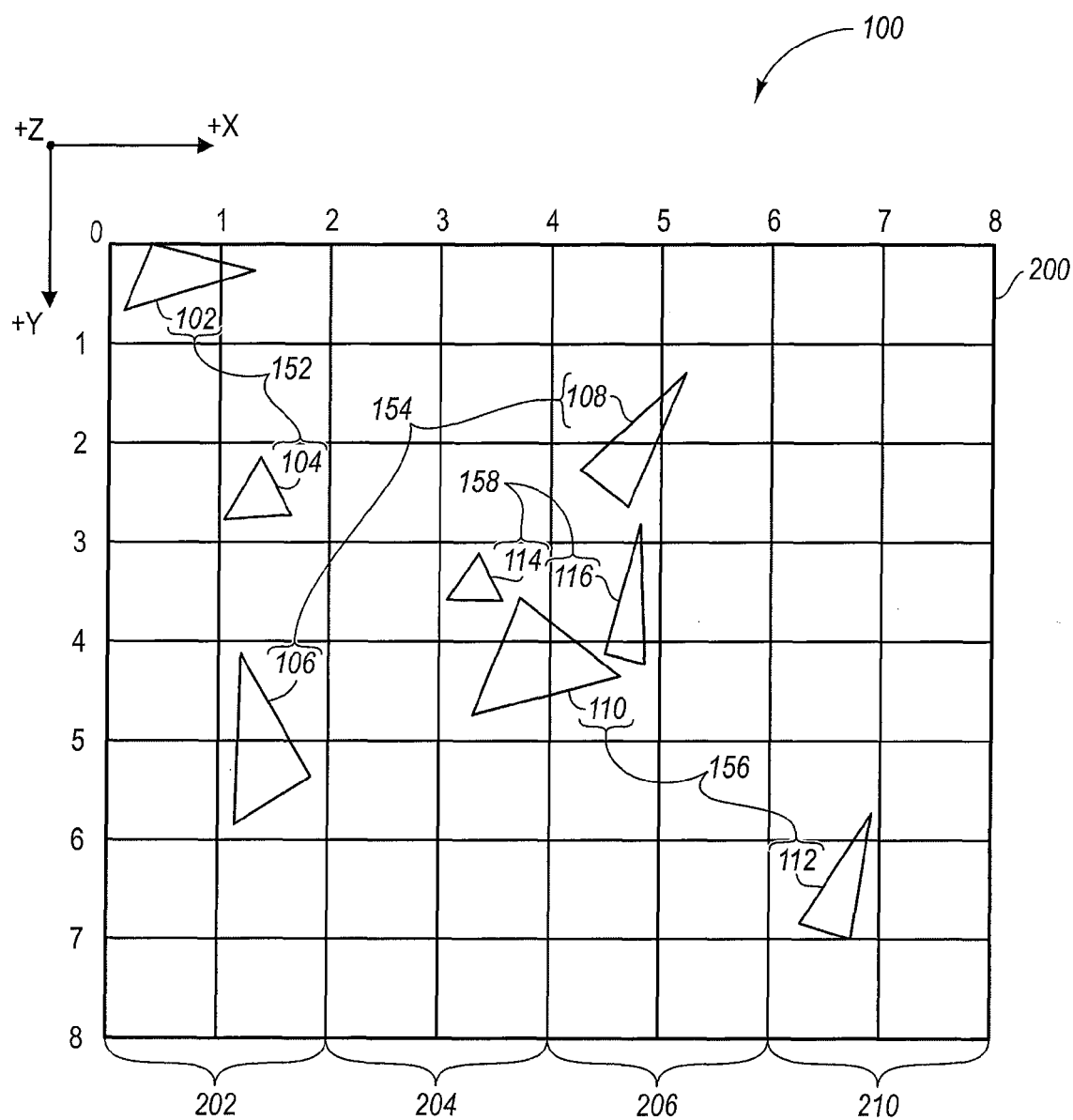
FIG. 1A is a schematic illustration of an example three-dimensional scene that is spatially divided into an example grid.

As noted above, example embodiments relate to grid population and, in particular, to methods for parallel population of a grid with a plurality of objects using a plurality of processors. The example methods disclosed herein enable a grid to be populated quickly and efficiently.

As used herein, the term "grid" is defined as a data structure including a plurality of cells that each defines a volume of three-dimensional space. The volume of three-dimensional space defined by each cell can have any three-dimensional shape including, but not limited to a cube, cuboid, or a rectangular box. Alternatively, each cell in a grid may be an acceleration data structure with a bounding box that defines a volume shaped as a cube, cuboid, or rectangular box. A grid may be uniform with each cell having substantially identical shape and size as all other cells. A grid may also be non-uniform with at least one cell having a different shape and/or different size from at least one other cell. In one example embodiment, a grid may include only contiguous cells. In another example embodiment, a grid may include non-contiguous cells.

As used herein, the term "object" is defined as a data structure that defines a volume in three-dimensional space. For example, objects may include, but are not limited to, points, lines, two-dimensional shapes (such as triangles), three-dimensional shapes, and/or acceleration data structures including, but not limited to, grids, kd-trees, bounded volume hierarchies (BVHs), octrees, and BSPs.

Where an object is described herein as being "bounded by" a first cell, it should be understood that this terminology refers to the volume defined by the object being completely spatially bounded within the volume defined by the first cell. Similarly, where an object is described herein as being "bounded by" a first cell and a second cell, it should be understood that this terminology refers to the volume defined by the object being completely spatially bounded within a volume defined by combining the volumes defined by the first and second cells, with some portion of the volume defined by the object being spatially bounded within each of the volumes defined by the first and second cells. Also, where an object is described herein as being "at least partially bounded by" a first cell, it should be understood that this terminology refers to at least some portion of the volume defined by the object being spatially bounded within the volume defined by the first cell. Further, where an object is described herein as being "at least partially bounded by" a first cell and a second cell, it should be understood that this terminology refers to at least some portion of the volume defined by the object being spatially bounded within a volume defined by combining the volumes defined by the first and second cells.

Also, where a ray is described herein as "hitting" a cell, it should be understood that this terminology refers to the ray intersecting with the volume defined by the cell. Conversely, where a ray is described herein as "missing" a cell, it should be understood that this terminology refers to the ray not intersecting with the volume defined by the cell.

The example methods disclosed herein and variations thereof can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed and executed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. The computer-executable instructions may be, for example, binaries, intermediate format instructions such as assembly language, or even source code. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

The example methods disclosed herein may be practiced in network computing environments with many types of computer system configurations, including, but not limited to, personal computers, desktop computers, laptop computers, hand-held devices, multi-processor systems, microprocessor-based or programmable consumer electronics, network PCs, minicomputers, mainframe computers, mobile telephones, and PDAs. Example embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In one example embodiment, methodological acts can be implemented in a ray tracing application. The ray tracing application can be a software application and/or a hardware application. The ray tracing application can include computer executable instructions that perform each of the example acts disclosed herein. The computer executable instructions of the ray tracing application may be executed on a multi-processor system in which at least a portion of the computer executable instructions are executed by each processor. As used herein, the term "processor" refers to a device capable of substantially independently executing computer-executable instructions. For example, where a single physical processor has two cores that are each capable of simultaneously and substantially independently executing computer-executable instructions, the two cores of the single physical processor are considered to be two separate processors. Examples of multi-processor systems include, but are not limited to, Symmetric Multi-Processing (SMP) systems, Nonuniform Memory Access (NUMA) systems, and distributed memory systems which are usually implemented as computer clusters.

1. Example Grid

FIG. 1A illustrates an example three-dimensional scene 100 that is spatially divided into an example grid 200. The example grid 200 includes a plurality of cells. Although the cells of the example grid 200 are schematically illustrated as two-dimensional rectangular shapes in FIG. 1A, it is noted that the cells of the example grid 200 are actually three-dimensional rectangular boxes. Thus, the example grid 200 is actually an (8×8×8) grid with 8 cells in the X direction, 8 cells in the Y direction, and 8 cells in the Z direction, for a total of 512 cells. Although the example grid 200 is illustrated as having only 512 cells, it is understood that the grid may have any number of cells, and indeed may have many thousands, millions, or billions of cells when used by a ray tracing or other application. Although the example grid 200 is schematically illustrated as a uniform and contiguous grid, example embodiments of the methods disclosed herein can alternatively use a non-uniform and/or non-contiguous grid.

As schematically illustrated in FIG. 1A, the scene 100 is made up of objects 102-116. Although the objects 102-116 in the scene 100 are illustrated as triangles, the example methods disclosed herein could alternatively populate a grid with other objects disclosed elsewhere herein.

2. Example Packet of Rays

Figure 1B:
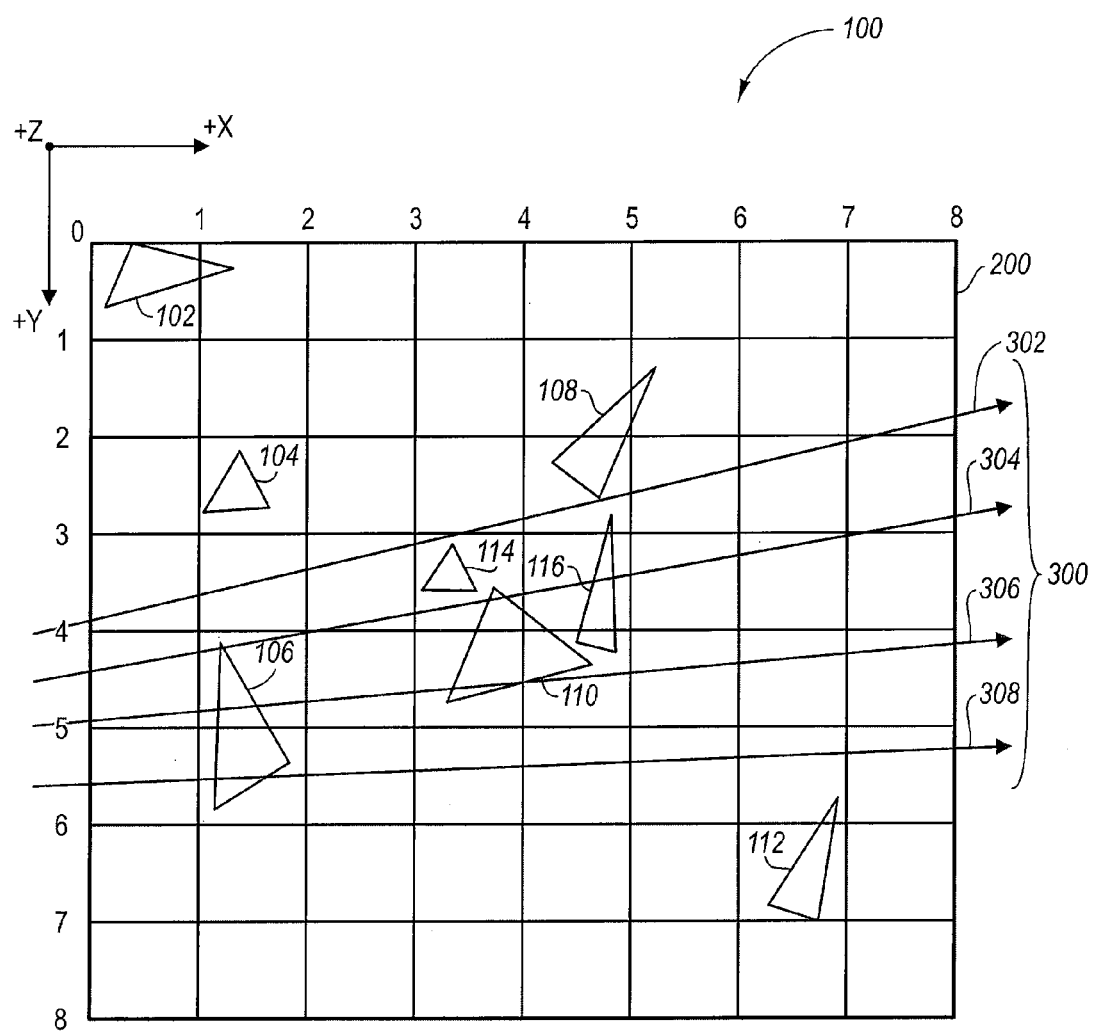
FIG. 1B is a schematic illustration of the example grid of FIG. 1A intersected by an example group of rays.

As noted above, a three-dimensional scene made up of objects can be spatially partitioned into a grid. The grid can then be used by a ray tracing application to decrease the number of ray intersection tests that are necessary in order to render the scene using a ray tracing rendering method. FIG. 1B illustrates an example packet 300 of example rays 302-308. As disclosed in FIG. 1B, the rays 302-308 in the packet 300 are coherent, although other example embodiments of the methods disclosed herein can be implemented with rays that are not coherent. Although the example packet 300 includes only four rays, it is understood that the example methods disclosed herein can employ packets having less than four rays and/or greater than four rays, for example, 3 rays, 21, rays, 23 rays, or 256 rays.

Although the example methods for populating a grid disclosed herein may be used in ray tracing, the example methods for populating a grid disclosed herein may also be used in other application that have need for a grid to be populated relatively quickly and efficiently. Therefore, the example methods for populating a grid disclosed herein are not limited to use in ray tracing applications.

3. Example Multi-Processor System

Figure 2:
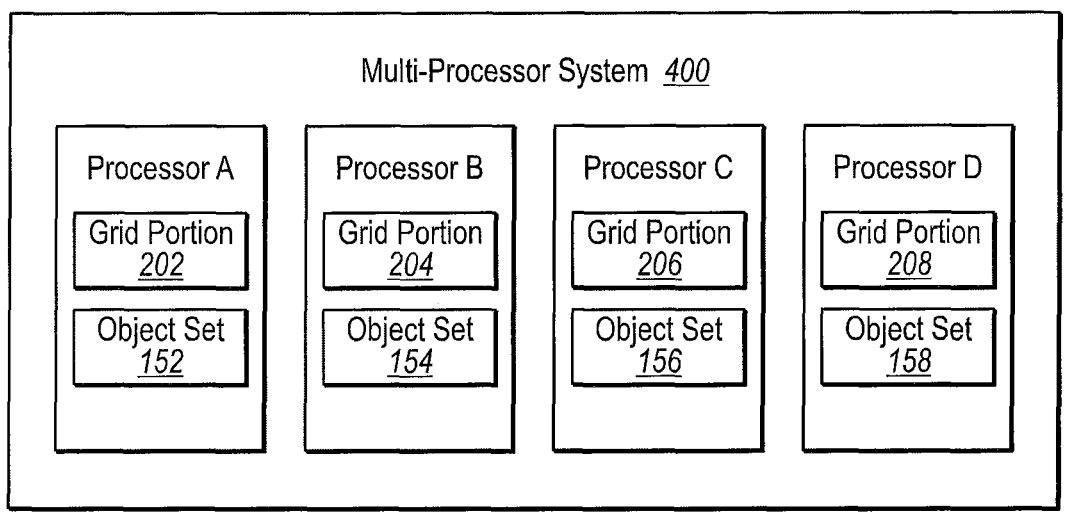
FIG. 2 is a schematic illustration of an example multi-processor system 400.

As noted above, the example methods for parallel population of a grid disclosed herein can be implemented as computer executable instructions that are capable of being executed by a multi-processor system. FIG. 2 is a schematic illustration of an example multi-processor system 400 that includes four processors A-D. The example multi-processor system 400 may be, but is not limited to, a Symmetric Multi-Processing (SMP) system, a Nonuniform Memory Access (NUMA) system, or a distributed memory system. Additional aspects of the example multi-processor system 400 will be disclosed below in connection with FIG. 3.

4. Example Method for Ray Tracing a Three-Dimensional Scene

Figure 3:
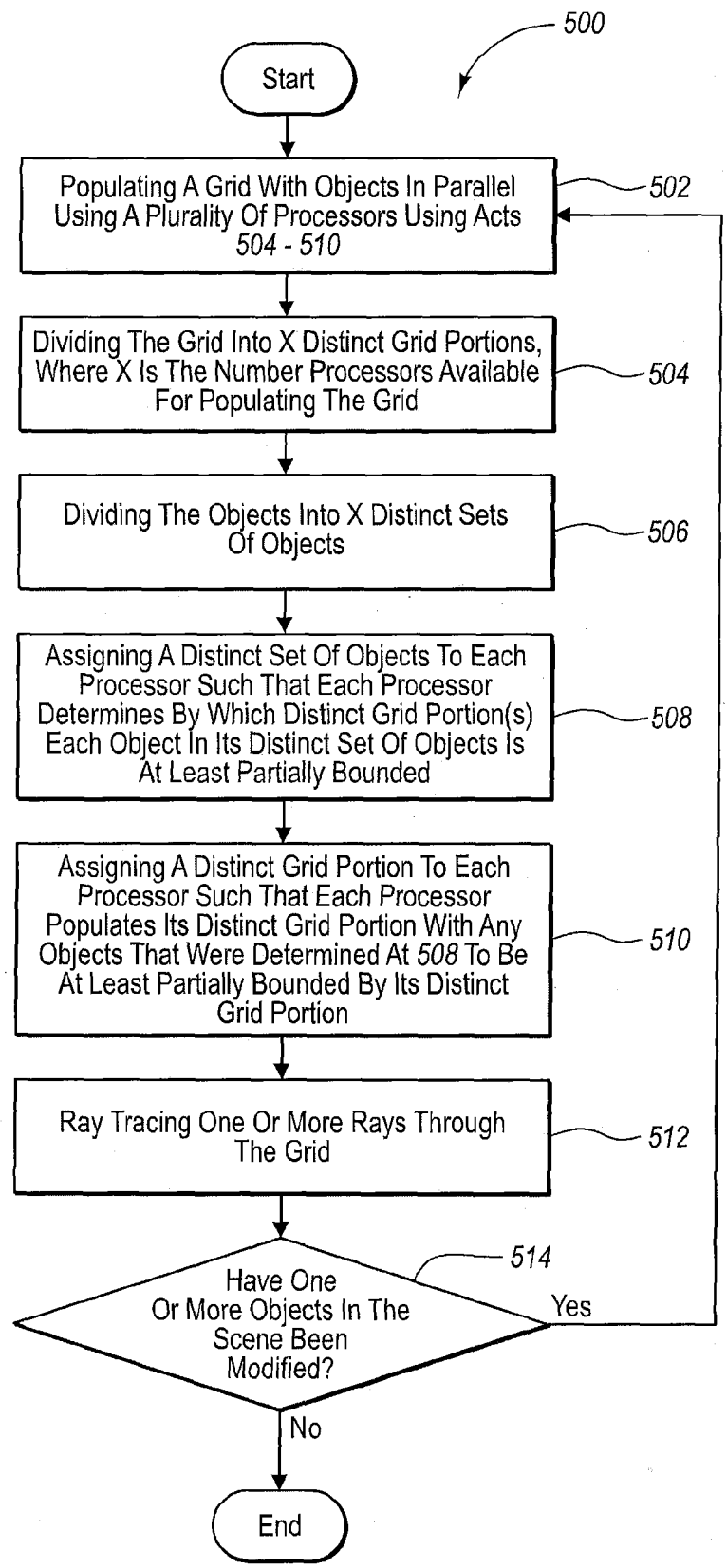
FIG. 3 is a flowchart that illustrates an example method for parallel population of a grid with a plurality of objects using a plurality of processors.

FIG. 3 illustrates an example method 500 for ray tracing a three-dimensional scene using a grid. As noted above, a grid includes a plurality of cells. The method 500 of FIG. 2 will be described with respect to the example scene 100 of example objects 102-116 of FIG. 1A, the example grid 200 of FIGS. 1A and 1B, and the example packet 300 of rays 302-308 of FIG. 1B.

The method 500 includes an act 502 of populating a grid with the objects in parallel using a plurality of processors. For example, the example grid 200 can be populated with the objects 102-116, as disclosed in FIG. 1A. This population can be performed by a ray tracing application in parallel using a plurality of processors in a multi-processor system. For example, a ray tracing application may make use of a multi-processor system that includes four separate processors, which, for purposes of this example, will be referred to as processors A-D.

The act 502 includes an act 504 of dividing a grid into x distinct grid portions, where x is the number of processors available for populating the grid. Continuing with the above example, the grid 200 may be divided into four distinct grid portions since there are four processors, processors A-D, available for populating the grid 200. The grid may be divided, for example, into four slices along the X axis with a first grid portion 202 including the cells between X=0 and X=2, a second grid portion including the cells between X=2 and X=4, a third grid portion including the cells between X=4 and X=6, and a fourth grid portion including the cells between X=6 and X=8. It is noted that although this example has the volume of each of the four distinct grid portions substantially equal to the volume of each of the other distinct grid portion, the grid 200 may alternatively be divided into four distinct grid portions where the volume of at least one of the four distinct grid portions is not substantially equal to the volume of each of the other distinct grid portions.

The act 502 also includes an act 506 of dividing the plurality of objects into n distinct sets of objects. Continuing with the above example, the objects 102-116 may be divided into four distinct sets of objects. The objects 102-116 may be divided, for example, into four sets with a first set 152 including objects 102 and 104, a second set 154 including objects 106 and 108, a third set 156 including objects 110 and 112, and a fourth set 154 including objects 114 and 116. It is noted that although this example has the number of objects in each of the four distinct sets of objects being substantially equal to the number of objects in each of the other distinct sets of objects, the objects 102-116 may alternatively be divided into four distinct sets of objects where the number of objects in at least one of the four distinct sets of objects is not substantially equal to the number of objects in each of the other distinct sets of objects. It is also noted that the objects 102-116 may alternatively be divided by various other criteria, such as attempting to substantially equalize the combined volume of the objects in each distinct set of objects.

The act 502 further includes an act 508 of assigning a distinct set of objects to each processor such that each processor determines by which distinct grid portion(s) each object in its distinct set of objects is at least partially bounded. Continuing with the above example, and as disclosed in FIG. 2, the first set 152 of objects can be assigned to the processor A, the second set 154 of objects can be assigned to the processor B, the third set 156 of objects can be assigned to the processor C, and the fourth set 158 of objects can be assigned to the processor D. Each of the processors A-D can then be tasked with determining by which distinct grid portion(s) each object in its distinct set of objects is at least partially bounded. For example, the processor A can determine that objects 102 and 104 are bounded by the first grid portion 202. The processor B can determine that the object 106 is bounded by the first grid portion 202 and the object 108 is bounded by the third grid portion 206. The processor C can determine that the object 110 is partially bounded by the second grid portion 204 and partially bounded by the third grid portion 206 and the object 112 is bounded by the fourth grid portion 210. The processor D can determine that the object 114 is bounded by the second grid portion 204 and the object 116 is bounded by the third grid portion 206.

These determinations made by the processors A-D can be stored by each individual processor in its own set of lists, with each list corresponding to a single grid portion. For example, processor A may maintain four lists, one for each of the four grid portions 202-208, and store its determinations made at act 508 in these lists. Simultaneously, the processor B may also maintain four lists, one for each of the four grid portions 202-208, and store its determinations made at act 508 in these lists. The processors C and D may each also maintain four lists, resulting in a total of 16 lists with four lists corresponding to each of the four grid portions 202-208.

The act 508 can further include each processor determining by which specific grid cell(s) within each distinct grid portion(s) each object in its distinct set of objects is at least partially bounded. For example, each of processors A-D can go beyond determining simply to which grid portion(s) each of its assigned objects is at least partially bounded, and can further determine which cell(s) each object is at least partially bounded by. For example, beyond determining that the objects 102 and 104 are at bounded by the first grid portion 202, the processor A can further determine which specific cell(s) that object 102 and 103 are bounded by within the first grid 202. This further determination can then be stored in the lists discussed above.

The act 502 further includes an act 510 of assigning a distinct grid portion to each processor such that each processor populates its distinct grid portion with any objects that were determined at act 508 to be at least partially bounded by its distinct grid portion. Continuing with the above example, and as disclosed in FIG. 2, the first grid portion 202 can be assigned to the processor A, the second grid portion 204 can be assigned to the processor B, the third grid portion 206 can be assigned to the processor C, and the fourth grid portion 208 can be assigned to the processor D. Each of the processors A-D can then be tasked with populating its distinct grid portion with any objects that were determined at the act 508 to be at least partially bounded by its distinct grid portion. For example, the processor A can access the four lists corresponding to the first grid portion 202, as discussed above, and populate the corresponding cells of the first grid portion 202 with the objects 102, 104, and 106. The processor B can access the four lists corresponding to the second grid portion 204 and populate the corresponding cells of the second grid portion 204 with the objects 114 and 110. The processor C can access the four lists corresponding to the third grid portion 206 and can populate the corresponding cells of the third grid portion 206 with the objects 108, 116, and 110. The processor D can access the four lists corresponding to the fourth grid portion 208 and can populate the corresponding cells of the fourth grid portion 208 with the object 112.

The method 500 further includes an act 512 of ray tracing one or more rays through the grid. For example, the example packet 300 of rays 302-308 can be traced through the example grid 200, as disclosed in FIG. 1B.

The method 500 further includes an act 514 of determining whether one or more objects in the scene have been modified. For example, in dynamically changing scenes used by simulation or game ray tracing applications, the objects in a scene may be modified in order to render, for example, movements in the scene. If it is determined at the act 514 that one or more objects in the scene have been modified, the method 500 proceeds to an act 516 of clearing the grid of all objects and then repeats acts 502-512. Alternatively, the grid could be cleared at act 516 of only those objects that have been modified, and the acts 502-512 could be repeated for only the subset modified objects from the original scene. The act 514 can be accomplished efficiently using, for example, techniques associated with macrocells, hierarchical grids, loosely nested grids, and recursive grids.

The example embodiments disclosed herein can enable a three-dimensional scene to be ray traced quickly and efficiently. Specifically, the example embodiments disclosed herein can contribute to an overall ray tracing method that is a viable alternative to other rendering methods such as Z-buffering, even for applications that make use of dynamically changing scenes, such as simulation and game applications. In particular, the example embodiments disclosed herein can achieve performance using grids that was previously available only using other types of hierarchical data structures.

The example embodiments disclosed herein may be embodied in other specific forms. The example embodiments disclosed herein are to be considered in all respects only as illustrative and not restrictive.

What is claimed is:
1. A method for populating a grid with a plurality of objects in parallel using a plurality of processors, the method comprising the following:
   prior to performing ray tracing of one or more rays through a grid, populating the grid with a plurality objects that make up a scene represented by the grid, including:

dividing the grid into a plurality of distinct grid portions, a number of the plurality of distinct grid portions corresponding to a number of a plurality of processors that are available for populating the grid;

dividing the plurality of objects that are to be populated into the grid into a plurality of distinct sets of one or more objects, a number of the plurality of distinct sets of objects corresponding to the number of the plurality of processors;

assigning a different distinct set of objects of the plurality of distinct sets of objects to each processor of the plurality of processors;

determining, in parallel with the plurality of processors, which one or more distinct grid portions of the plurality of distinct grid portions bound each of the plurality of objects, including each processor simultaneously determining by which one or more distinct grid portions of the plurality of distinct grid portions each object in said processor's assigned distinct set of objects is at least partially bounded, including each processor storing a list for each of the plurality of distinct grid portions, each list identifying any objects that said processor determined to be at least partially bounded by the distinct grid portion corresponding to the list;

assigning a different distinct grid portion of the plurality of distinct grid portions to each processor of the plurality of processors; and subsequent to determining which one or more distinct grid portions bound each of the plurality of objects, populating, in parallel with the plurality of processors, the grid with the plurality of objects, including each processor simultaneously populating said processor's assigned distinct grid portion with any objects of the plurality of objects that were determined by any processor to be at least partially bounded by said processor's assigned distinct grid portion, each processor identifying which objects that are least partially bounded by said processor's assigned distinct grid portion by accessing each list that was stored by each of the plurality of processors; and subsequent to populating the grid with the plurality of objects, performing ray tracing of one or more rays through the grid.

2. The method as recited in claim 1, wherein the volume of each distinct grid portion is substantially equal to the volume of each other distinct grid portion.

3. The method as recited in claim 1, wherein the combined volume of the objects in each distinct set of objects is substantially equal to the combined volume of the objects in each other distinct set of objects.

4. The method as recited in claim 1, wherein the number of objects in each distinct set of objects is substantially equal to the number of objects in each other distinct set of objects.

5. The method as recited in claim 1, wherein determining which one or more distinct grid portions bound each of the plurality of objects further comprises each processor determining by which specific grid cell(s) within each one or more distinct grid portion each object in said processor's distinct set of objects is at least partially bounded.

6. The method as recited in claim 5, wherein populating the grid with the plurality of objects further comprises each processor populating said processor's distinct grid portion with any objects that were determined to be at least partially bounded by specific cell(s) of said processor's distinct grid portion.

7. The method as recited in claim 1, wherein the grid comprises a plurality of cells, and wherein the plurality of cells in the grid are uniform.

8. The method as recited in claim 1, wherein at least one cell in the grid is an acceleration data structure with a bounding box that defines a volume shaped as a cube, cuboid, or rectangular box.

9. The method as recited in claim 1, wherein at least one of the objects is defined in three-dimensional space using one or more of the group comprising: a grid, a kd-tree, a bounded volume hierarchy (BVH), an octree, and a BSP.

10. A computer system for ray tracing a three-dimensional scene made up of objects using a grid that includes a plurality of cells, the computer system comprising:

a plurality of processors; and one or more non-transitory computer-readable media having computer-executable instructions thereon which, when executed, cause the computer system to perform at least the following:

prior to performing ray tracing of one or more rays through a grid, populating the grid with a plurality of objects that make up a scene represented by the grid, including:

dividing the grid into a plurality of distinct grid portions, a number of the plurality of distinct grid portions corresponding to a number of a plurality of processors that are available for populating the grid;

dividing the plurality of objects that are to be populated into the grid into a plurality of distinct sets of one or more objects, a number of the plurality of distinct sets of objects corresponding to the number of the plurality of processors;

assigning a different distinct set of objects of the plurality of distinct sets of objects to each processor of the plurality of processors;

determining, in parallel with the plurality of processors, which one or more distinct grid portions of the plurality of distinct grid portions bound each of the plurality of objects, including each processor simultaneously determining by which one or more distinct grid portions of the plurality of distinct grid portions each object in said processor's assigned distinct set of objects is at least partially bounded, including each processor storing a list for each of the plurality of distinct grid portions, each list identifying any objects that said processor determined to be at least partially bounded by the distinct grid portion corresponding to the list;

assigning a different distinct grid portion of the plurality of distinct grid portions to each processor of the plurality of processors; and subsequent to determining which one or more distinct grid portions bound each of the plurality of objects, populating, in parallel with the plurality of processors, the grid with the plurality of objects, including each processor simultaneously populating said processor's assigned distinct grid portion with any objects of the plurality of objects that were determined to be at least partially bounded by said processor's assigned distinct grid portion, each processor identifying which objects that are least partially bounded by said processor's assigned distinct grid portion by accessing each list that was stored by each of the plurality of processors; and subsequent to populating the grid with the plurality of objects, performing ray tracing one or more rays through the grid.

11. The computer system as recited in claim 10, wherein the volume of each distinct grid portion is substantially equal to the volume of each other distinct grid portion.

12. The computer system as recited in claim 10, wherein the combined volume of the objects in each distinct set of objects is substantially equal to the combined volume of the objects in each other distinct set of objects.

13. The computer system as recited in claim 10, wherein the number of objects in each distinct set of objects is substantially equal to the number of objects in each other distinct set of objects.

14. The computer system as recited in claim 10, wherein the grid comprises a plurality of cells, and wherein the plurality of cells in the grid are uniform.

15. The method as computer system in claim 10, wherein at least one cell in the grid is an acceleration data structure with a bounding box that defines a volume shaped as a cube, cuboid, or rectangular box.

16. The computer system as recited in claim 10, wherein at least one of the objects is defined in three-dimensional space using one or more of the group comprising: a grid, a kd-tree, a bounded volume hierarchy (BVH), an octree, and a BSP.

17. The computer system as recited in claim 10, further comprising computer-executable instructions which, when executed, also cause the computer system to perform:
determining that the plurality of objects in the scene have been modified;
clearing the grid of objects; and
re-populating the grid with the modified plurality objects.

18. One or more non-transitory computer-readable media having computer executable instructions thereon which, when executed, implement a method for populating a grid with a plurality of objects in parallel using a plurality of processors, the method comprising the following:
prior to performing ray tracing of one or more rays through a grid, populating the grid with a plurality objects that make up a scene represented by the grid, including:
dividing the grid into a plurality of distinct grid portions, a number of the plurality of distinct grid portions corresponding to a number of a plurality of processors that are available for populating the grid;
dividing the plurality of objects that are to be populated into the grid into a plurality of distinct sets of one or more objects, a number of the plurality of distinct sets of objects corresponding to the number of the plurality of processors;
assigning a different distinct set of objects of the plurality of distinct sets of objects to each processor of the plurality of processors;
determining, in parallel with the plurality of processors, which one or more distinct grid portions of the plurality of distinct grid portions bound each of the plurality of objects, including each processor simultaneously determining by which one or more distinct grid portions of the plurality of distinct grid portions each object in said processor's assigned distinct set of objects is at least partially bounded, including each processor storing a list for each of the plurality of distinct grid portions, each list identifying any objects that said processor determined to be at least partially bounded by the distinct grid portion corresponding to the list;
assigning a different distinct grid portion of the plurality of distinct grid portions to each processor of the plurality of processors; and
subsequent to determining which one or more distinct grid portions bound each of the plurality of objects, populating, in parallel with the plurality of processors, the grid with the plurality of objects, including each processor simultaneously populating said processor's assigned distinct grid portion with any objects of the plurality of objects that were determined by any processor to be at least partially bounded by said processor's assigned distinct grid portion, each processor identifying which objects that are least partially bounded by said processor's assigned distinct grid portion by accessing each list that was stored by each of the plurality of processors; and
subsequent to populating the grid with the plurality of objects, performing ray tracing of one or more rays through the grid.

19. The one or more non-transitory computer-readable media as recited in claim 18, wherein the volume of each distinct grid portion is substantially equal to the volume of each other distinct grid portion.

20. The one or more non-transitory computer-readable media as recited in claim 18, wherein the combined volume of the objects in each distinct set of objects is substantially equal to the combined volume of the objects in each other distinct set of objects.

* * * * *